(12) United States Patent
Dehn et al.

(10) Patent No.: US 7,159,741 B2
(45) Date of Patent: Jan. 9, 2007

(54) CAP FOR A FUEL CONTAINER

(75) Inventors: James J. Dehn, Brookfield, WI (US); Thomas G. Guntly, Hartford, WI (US); Peter D. Shears, Wauwatosa, WI (US); Bradley Deml, Campbellsport, WI (US); Marvin Klowak, Germantown, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 11/296,123

(22) Filed: Dec. 7, 2005

(65) Prior Publication Data

US 2006/0086738 A1 Apr. 27, 2006

Related U.S. Application Data

(63) Continuation of application No. 10/465,499, filed on Jun. 19, 2003, now Pat. No. 6,942,124, which is a continuation-in-part of application No. 10/209,687, filed on Aug. 1, 2002, now Pat. No. 6,981,532.

(51) Int. Cl.
*B67D 5/00* (2006.01)

(52) U.S. Cl. .................. 222/83.5; 222/81; 222/129; 220/86.2; 123/1 A

(58) Field of Classification Search .................. 222/81, 222/129, 189.09
See application file for complete search history.

(56) References Cited

U.S. PATENT DOCUMENTS

| | | | |
|---|---|---|---|
| 2,955,028 A | 10/1960 | Bevans | |
| 4,024,991 A | 5/1977 | Tyson et al. | |
| 4,214,615 A | 7/1980 | Boyer | |
| 4,596,277 A | 6/1986 | Djordjevic | |
| 4,618,444 A * | 10/1986 | Hudson et al. | ............. 8/111 |
| 4,971,118 A | 11/1990 | Cluff | |
| 5,004,025 A | 4/1991 | Robbins | |
| 5,059,217 A | 10/1991 | Arroyo et al. | |
| 5,249,552 A | 10/1993 | Brooks | |
| 5,421,295 A | 6/1995 | Lemaire et al. | |
| 5,456,217 A | 10/1995 | Thunker et al. | |
| 5,573,557 A | 11/1996 | Thunker et al. | |
| 5,580,359 A | 12/1996 | Wright | |
| 5,662,799 A | 9/1997 | Hudgens et al. | |
| 5,695,531 A | 12/1997 | Makino et al. | |
| 5,735,320 A | 4/1998 | Tune et al. | |
| 5,992,473 A | 11/1999 | Hammonds | |
| 6,003,728 A * | 12/1999 | Elliott | ............. 222/81 |

(Continued)

FOREIGN PATENT DOCUMENTS

| | | | |
|---|---|---|---|
| DE | 100 00 396 A | | 7/2001 |
| JP | 07 224734 A | | 8/1995 |

OTHER PUBLICATIONS

R.T. Vanderbilt Company, Inc., Vanlube PCX Specification sheet, Dec. 30, 1992, 1 page.

(Continued)

*Primary Examiner*—J. Casimer Jacyna
(74) *Attorney, Agent, or Firm*—Michael Best & Friedrich LLP

(57) ABSTRACT

A cap for covering an opening of a spout. The cap includes a top that defines an inner surface and an outer surface. An engagement portion extends from the inner surface and is adapted to engage the spout. A wall extends from the inner surface to define a container-receiving space and a pierce point extends from the inner surface and is at least partially disposed within the container-receiving space.

24 Claims, 9 Drawing Sheets

U.S. PATENT DOCUMENTS

| | | |
|---|---|---|
| 6,238,554 B1 | 5/2001 | Martin, Jr. et al. |
| 6,263,924 B1 | 7/2001 | Grosser |
| 2001/0000400 A1 | 4/2001 | Stehouwer et al. |
| 2004/0026291 A1 | 2/2004 | Drozd et al. |

OTHER PUBLICATIONS

R.T. Vanderbilt Co., Vanlube product information from web site, http://www.rtvanderbilt.com/petro_1.htm, printed Jul. 16, 2002.

Octel Starreon, LLC, DMA-H54 Material Safety Data Sheet, Revised Mar. 20, 2002, pp. 1-7.

Octel Starreon, LLC., Antioxidant No. 30 (AO-30) Material Safety Data Sheet, Revised Mar. 19, 2002, pp. 1-6.

Octel Starreon, LLC., DCI-6A Material Safety Data Sheet, revised Feb. 14, 2002, pp. 1-7.

Octel Starreon, LLC., DMD-2 Material Safety Data Sheet, revised Mar. 14, 2002, pp. 1-8.

Interface Solutions, Inc., Who We Are, web site http://www.sealinfo.com/isiweb/website.nsf/CompanyInfoView/Who+We+Are?Open Document, printed Jul. 5, 2002, pp. 1-4.

Interface Solutions, Inc., M-5201 Hydro-Fused/Nonasbestos Gasket Material, ASTMF723133E22M6 Specification Sheet, Revised Dec. 5, 2001, pp. 1-2.

Pall Corporation, "Did You Know?Hydrophobic Membranes Are Used In Automotive Applications", website http://www.pall.com/34445_4485.asp, first visited on Apr. 24, 2003.

Pall Specialty Materials, Product specification sheet for Supor® R Membrane, A FluoRepel™ Treated Membrane, and Appendix C—Basic Filtration Concepts, pp. 84-86, received Apr. 24, 2003.

* cited by examiner

CAP FOR A FUEL CONTAINER

RELATED APPLICATION DATA

This is a continuation of U.S. patent application Ser. No. 10/465,499 filed on Jun. 19, 2003 now U.S. Pat. No. 6,942,124, which is a continuation-in-part patent application of U.S. patent application Ser. No. 10/209,687 filed on Aug. 1, 2004 now U.S. Pat. No. 6,981,532, both of which are fully incorporated herein by reference.

BACKGROUND

The present invention relates to fuel containers, and particularly to containers to which fuel additives are introduced.

Equipment employing an internal combustion engine, such as a lawnmower, includes a fuel system that supplies fuel to the engine. The system includes a tank, in which fuel is stored for use. Because the equipment is used intermittently, it is desirable to include a fuel additive in the fuel to protect the engine from damage. The additive may include a rust inhibitor, a de-moisturizer, a metal deactivator, an anti-oxidant, etc. Known additives include fuel stabilizers that are often mixed with the fuel in a storage container or added to the fuel tank before engine use.

Often fuel containers store large amounts of fuel for use in one or more pieces of equipment. These containers or tanks may hold fuel for long periods of time. During this time, contaminates (e.g., water, metals, dirt, etc.) can collect in the fuel. Therefore, it is desirable to add fuel additives to these tanks or containers.

Additives require precise mixing to reach their full effectiveness. Often this requires the user to mix the additive in a storage container or estimate the amount required in the fuel tank. These estimates result in inaccuracies in the mixture that can reduce the effectiveness of the additive or worse, can cause harm to the engine.

Furthermore, fuel degradation is known to be greatest when the fuel has been standing in a container after a period of inactivity. Therefore, an increase in the ratio of additive to fuel in the fuel container following a long idle period is desirable.

SUMMARY

The present invention provides a cap for covering an opening of a spout. The cap includes a top that defines an inner surface and an outer surface. An engagement portion extends from the inner surface and is adapted to engage the spout. A wall extends from the inner surface to define a container-receiving space and a pierce point extends from the inner surface and is at least partially disposed within the container-receiving space.

In another construction, the invention provides a cap adapted to cover an opening of a spout of a fuel container and hold a reservoir that contains a fluid for delivery to the container. The cap includes a top that defines an inner surface and an outer surface. An engagement portion is integrally-formed as part of the top and extends from the inner surface. The engagement portion is adapted to engage the spout. A wall is integrally-formed as part of the top and extends from the inner surface to define a space. A reservoir-engagement member is disposed substantially within the space and is adapted to engage the reservoir to hold the reservoir at least partially within the space.

The invention also provides a cap for covering an opening of a spout. The cap includes a top that defines an inner surface and an outer surface. An engagement portion extends from the inner surface and is adapted to engage the spout. A wall extends from the inner surface to define an inner cylindrical surface and a container-receiving space. One of a slot and a tab extends around at least a portion of the inner cylindrical surface and is adapted to engage the other of the slot and the tab of a reservoir.

The invention further provides a cap adapted to cover a spout and hold a reservoir. The cap includes a shell that includes a top portion and an engagement portion that extends from the top portion. The engagement portion is adapted to engage the spout. A reservoir engagement member extends from the shell and is adapted to engage and hold the reservoir. A pierce point is coupled to the shell and is positioned to puncture a portion of the reservoir.

BRIEF DESCRIPTION OF THE DRAWINGS

The detailed description particularly refers to the accompanying figures in which.

DETAILED DESCRIPTION OF THE DRAWINGS

Figure 1:
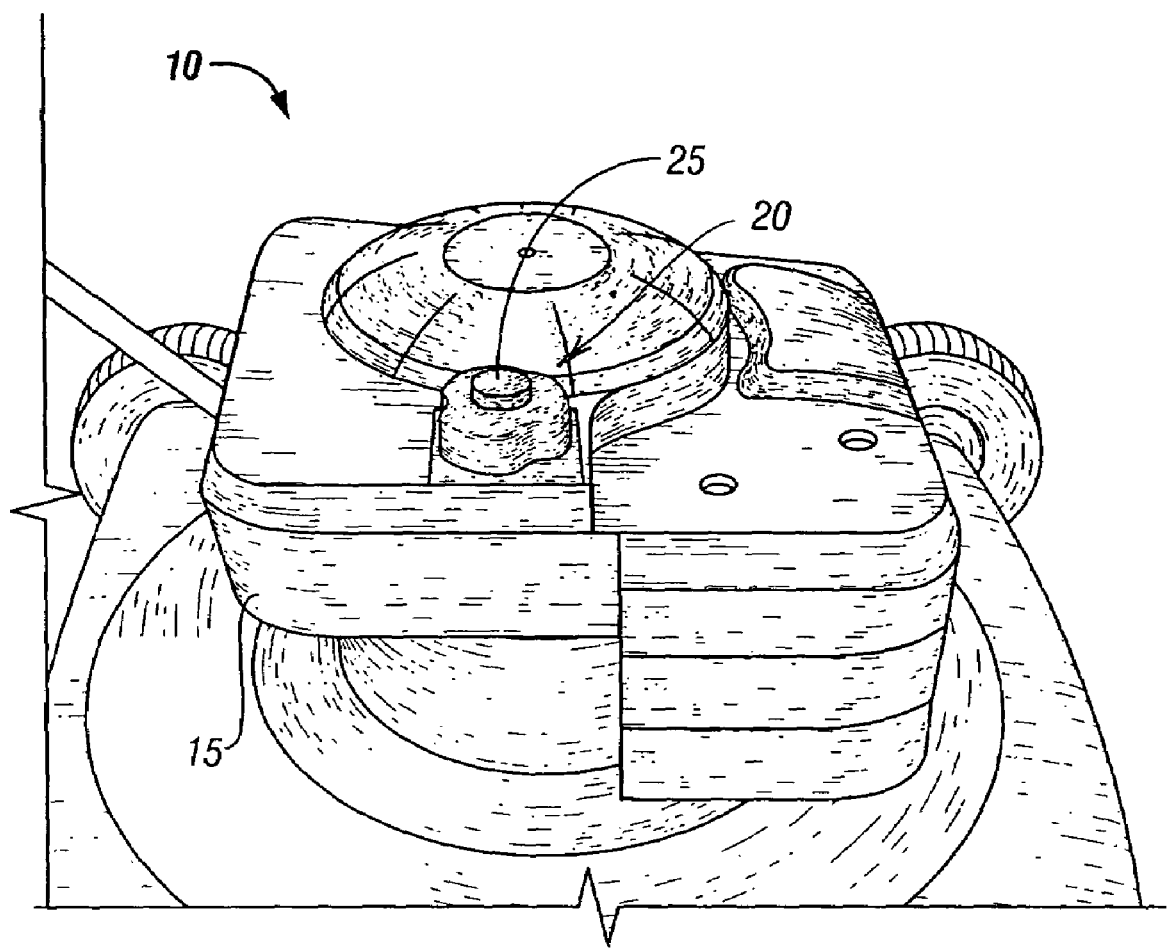
FIG. 1 is a perspective view of a portion of a lawnmower including a cap embodying the invention.

With reference to FIG. 1, a lawnmower 10 includes an engine having a fuel tank 15 and a cap 20. Included in the cap 20 is a drip feed apparatus 25 of the invention. While the invention is illustrated attached to a lawnmower engine, it should be understood that the invention will function with other internal combustion or diesel engines to provide an additive to the fuel. In addition, the invention will function with other types of fuel containers such as free-standing fuel tanks used in agriculture or construction to re-fuel equipment and portable fuel containers. Therefore, the invention should not be limited to lawnmower engines alone, nor should it be limited to engines having fuel tanks.

Figure 2:
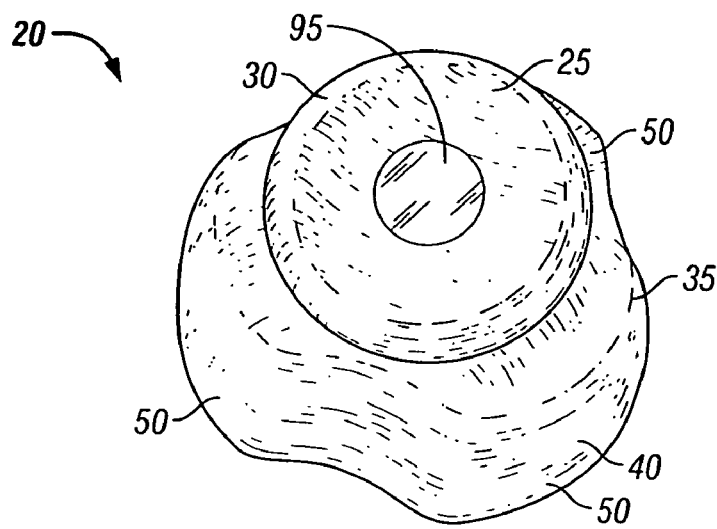
FIG. 2 is a perspective view of the cap shown in FIG. 1.
Figure 3:
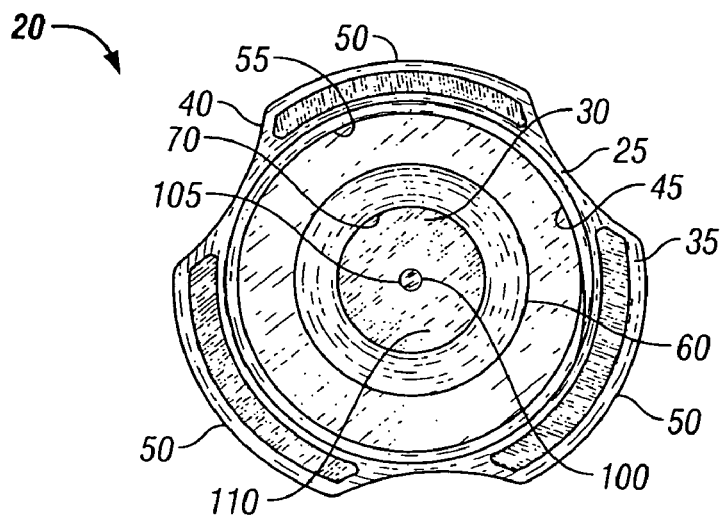
FIG. 3 is a bottom view of the cap shown in FIG. 1.
Figure 4:
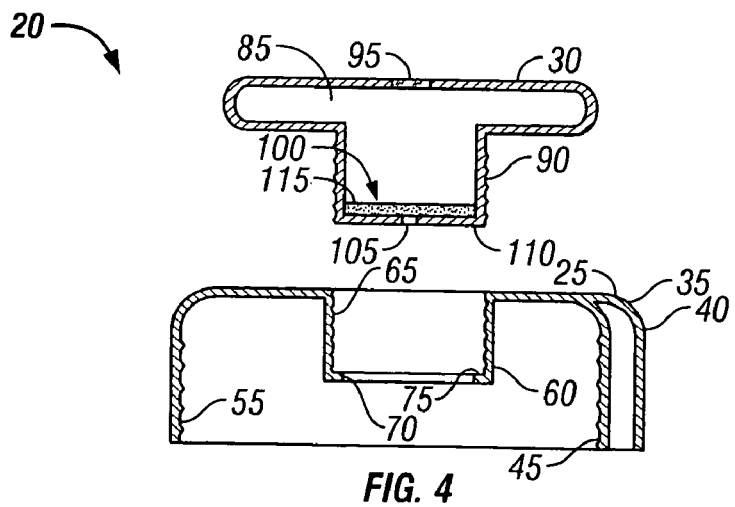
FIG. 4 is an exploded cross-sectional view of the cap of FIG. 1.

Turning to FIGS. 2–4, a construction of the fuel cap 20 includes a first housing such as a reservoir 30 and a second housing such as a cap shell 35. The cap shell 35 includes an outer surface 40 and an inner surface 45. The shape of the outer surface 40 of the cap shell defines a grip for the user. In the construction of FIGS. 2–4, the grip includes three lobes 50. However, other shapes will also function to define a grip for the user. For example, a four-lobed cap shell or vertical ribs provide satisfactory grips for the user and is contemplated by the invention.

The cap shell 35 further includes a first threaded portion 55 and a receptacle 60 for receiving the reservoir 30. The first threaded portion 55 provides a suitable engagement between the cap shell 35 and the opening of the fuel tank 15 or container to which it attaches. Other attachment methods (e.g., snap-fittings, cam-locks, etc.) will function with the invention.

The receptacle 60 projects toward the inner surface 45 of the shell 35 away from the outer surface 40 and includes a second threaded portion 65, an aperture 70, and a shoulder 75. The second threaded portion 65 includes threads that are sized to engage the reservoir 30. The large aperture 70 extends through the cap shell 35 and defines an opening between the exterior of the container and the interior of the container to which the shell 35 attaches. The shoulder 80 located adjacent the aperture 70 provides a stop for the reservoir 30 and allows the reservoir 30 to be fully inserted into the cap shell 35.

The reservoir 30, shown in section in FIG. 4, defines a chamber 85 in which a fuel additive can be stored for use. The reservoir 30 also includes a threaded portion 90, a window portion 95, and a release section 100.

The threaded portion 90 of the reservoir 30 is engagable with the second threaded portion 65 of the cap shell 35. When in the engaged position, the reservoir 30 closes the aperture opening between the container exterior and the container interior, thus defining a container cap 20. In the construction of FIGS. 2–4, the reservoir 30 in combination with the cap shell 35 defines a cap 20 capable of sealing a container or fuel tank 15.

The release section 100 includes an aperture 105, illustrated in the bottom surface 110 of the reservoir 30 in FIG. 4, that provides for a flow path out of the reservoir 30. It should be noted that some constructions do not include an aperture 105 but instead employ a reservoir 30 having a bottom surface 110 made of a permeable material (discussed below). The aperture size at least partially determines the rate at which additive is added to the fuel. For example, an aperture 105 may be sized to provide only one drop of fuel in a twenty-four hour period, while a larger aperture 105 may provide three drops. A smaller aperture 105 may provide only one drop of additive per week. The rate of flow is based on many variables (e.g., additive composition, fuel type, tank size, etc.) and should be determined individually for the desired application. It should be noted that the time period for delivery need not be precise. For example, a release section 100 that provides one drop of additive per day may actually deliver one drop on one day, no drops the second day, and two drops the third day. While the flow rate is given as one drop per day, it should be measured and averaged over a longer time period, perhaps a week (i.e., 7 drops in one week) or even a month (i.e., 30 drops in one month) to determine the actual flow rate.

To further control the flow rate out of the reservoir 30, the release section 100 of FIG. 4 includes a membrane 1 15 disposed within the reservoir 30. The membrane 115 is disposed between the fuel and the fuel additive so that the additive must pass through the membrane 115 to get to the fuel. The membrane 115 provides a permeable layer that allows the additive to pass at a predictable rate (e.g., 0.01–0.02 grams/day).

In addition to being permeable, the membrane 115 is preferably also resistive to gasoline vapor or any fuel vapor that it may be exposed. Furthermore, it is desirable that the membrane 115 have a low swell rate that can be bonded directly to the reservoir 30. Higher swell rate materials will function with the invention but may have a tendency to de-bond from the reservoir 30 or component to which they are attached.

The membrane 115 swells when it is exposed to fuel vapor. The swelling allows the membrane to begin dispensing fuel additive (i.e., activates the membrane 115). If the membrane 115 is not exposed to fuel vapor it will not dispense additive or will dispense additive at a substantially slower rate. Thus, the membrane prevents or reduces waste by preventing or significantly reducing the dispensing of fuel additive into an empty container.

Other membranes dispense fuel at a substantially constant rate regardless of the presence or absence of fuel vapor. No matter the membrane used, it should automatically dispense additive.

The term "automatically" as used herein should be read to include release sections that release fuel additive independent of any user action. For example, as just described, the release section requires only the presence of fuel or fuel vapors to dispense additive. No other action by the user is required. On the other hand, an additive dispenser that dispenses additive only when fuel is flowing into a tank or flowing through a particular component would not be considered "automatic" as that term is used herein.

A suitable membrane material would be a hydro-fused/non-asbestos gasket material such as ASTM-F723133E22M6 manufactured and sold by Interface Solutions, Inc. of Lancaster Pennsylvania and sold as the N8092 gasket. Other constructions use other materials such as cork, or fibrous paper-type gasket materials. The membrane is approximately one-sixty-fourth of an inch thick with thinner and thicker membranes possible.

The material used for the membrane, the thickness of the membrane, and the surface area of the membrane are all variables that combine to determine the rate of flow through the membrane. Therefore, great variation in these properties is contemplated by the present invention depending on the specific application.

In the constructions illustrated in FIGS. 2–7 the membrane 115 is disposed within the reservoir 30 such that the additive must first pass through the membrane 115 to reach the aperture 105. In another construction, the membrane 115 is disposed outside of the reservoir 30. In this construction, the additive passes through the aperture 105 and is absorbed by the membrane 115. The membrane 115 then delivers the additive to the fuel tank 15 or container.

In yet another construction, the membrane 115 forms the bottom surface of the reservoir 110. In this construction, the membrane 115 alone separates the additive from the fuel and determines the rate of flow of additive to the fuel tank 15 or container.

Figure 12:
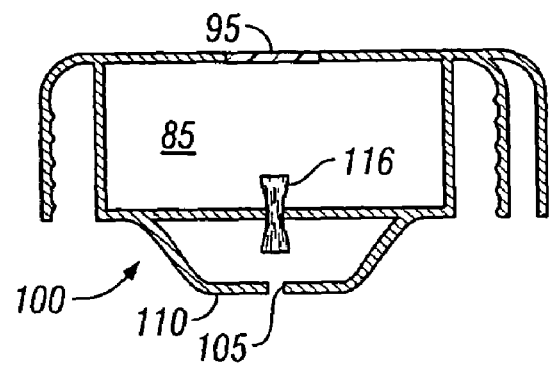
FIG. 12 is a cross-sectional view of an alternate construction of the release section of a drip feed apparatus.
Figure 13:
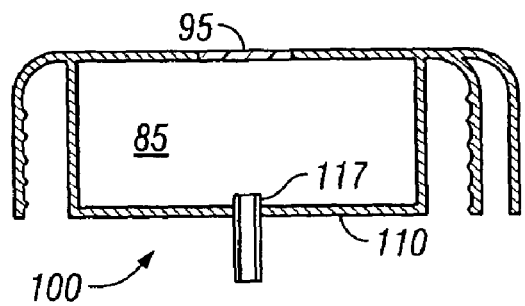
FIG. 13 is a cross-sectional view of another alternate construction of the release section of a drip feed apparatus.

Another construction of the release section 100, illustrated in FIG. 12, includes a wick 116 that extends into the chamber 85 rather than a membrane 115. The wick 116 utilizes capillary action in a known manner to deliver additive or additive dissolved in fuel from the chamber 85 to the fuel container or tank 15. While FIG. 12 illustrates a flexible wick 116, a capillary tube 117, as illustrated in FIG. 13, would also function to deliver additive to the tank 15 or container.

Figure 14:
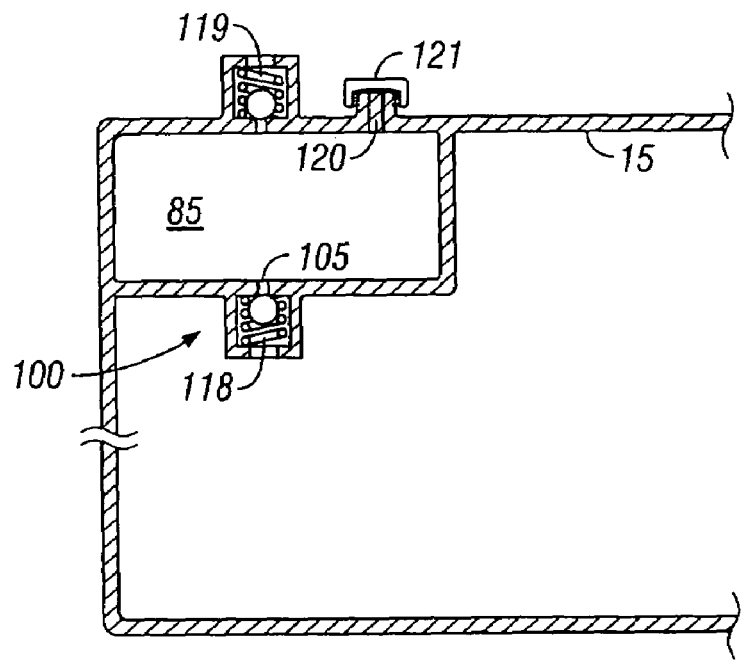
FIG. 14 is a cross-sectional view of an alternate construction of a drip feed apparatus.

In still another construction, illustrated in FIG. 14, the release section includes a check valve 118 that opens to deliver additive to the tank 15 or container. In this construction, the fuel tank 15 is vented to prevent pressurization or maintain the tank 15 at a pressure slightly above atmospheric pressure. The diurnal pressure fluctuations and temperature fluctuations of the atmosphere act to increase the pressure within the chamber 85, which is sealed. When the pressure reaches a predetermined differential (chamber pressure minus fuel tank pressure), the check valve 118 opens and additive is dispensed. The release of additive equalizes the pressure between the fuel tank 15 and the chamber 85, thereby allowing the check valve 118 to close. Because the diurnal effect is greatest during the hot summer months, a greater quantity of additive will be delivered during this period of time. In addition, a second check valve 119 may be used to deliver air to the chamber 85 to aid in equalizing the chamber pressure. Also illustrated in FIG. 14 is a fill hole 120 and cap 121 that allows for the refill of the chamber 85.

FIG. 2 best illustrates the window portion 95 of the reservoir 30. The window portion 95 is a clear portion that allows for the visual inspection of the chamber 85 within the reservoir 30. Thus, a user can visually determine whether fuel additive is present within the reservoir 30. In another construction, a portion of the sidewall of the reservoir 30 is transparent to allow the visual determination of the quantity of fuel additive within the reservoir 30.

Figure 5:
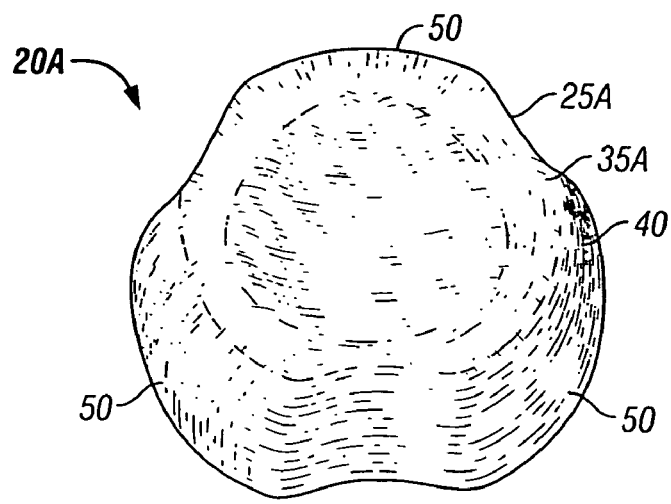
FIG. 5 is a first alternate construction of a cap embodying the invention.
Figure 6:
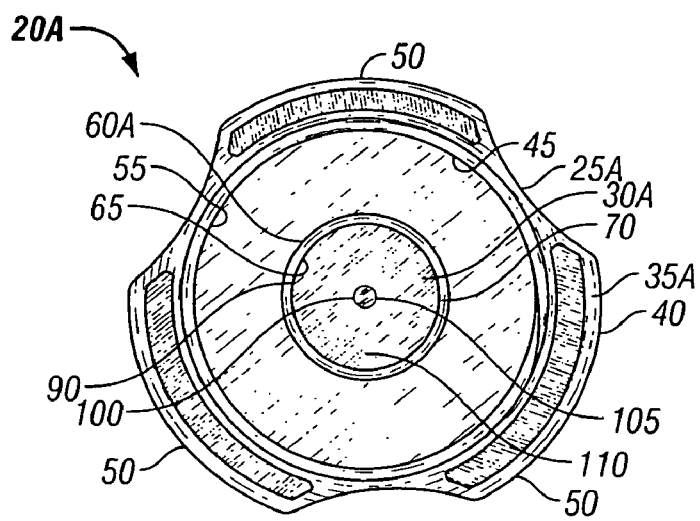
FIG. 6 is a bottom view of the cap shown in FIG. 5.
Figure 7:
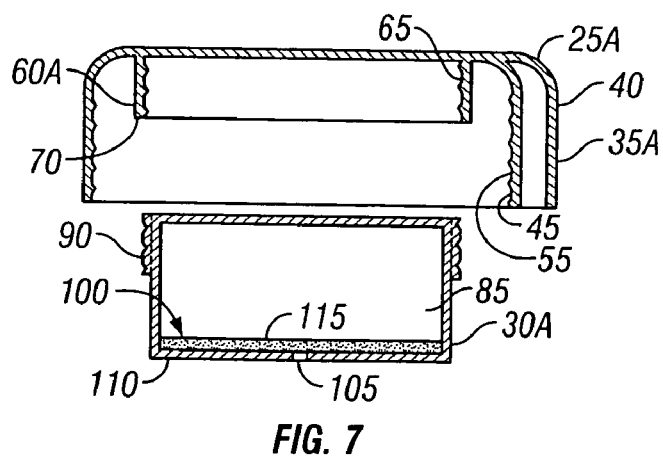
FIG. 7 is an exploded cross-sectional view of the cap of FIG. 5.

FIGS. 5–7 illustrate another construction of the cap 20A in which the cap shell 35A, or second housing, provides a sealing cover for the tank 15 or container opening. A receptacle 60A is disposed on the inside surface 45 of the cap shell 35A to support the reservoir 30A or first housing. The reservoir 30A in the construction of FIGS. 5–7 would not be visible to the user when the cap 20A is connected to the tank 15 or container.

The reservoir 30A, like the reservoir 30 of FIGS. 2–4, defines a fuel additive chamber 85. In preferred constructions, the fuel additive chamber 85 is large enough to hold about 8 ml of fluid with larger or smaller reservoirs possible depending on the application. For example, a chain saw may require a reservoir that only holds 4 ml of additive. On the other hand, a large fuel storage tank may require a reservoir as large as 1000 ml.

Figure 8:
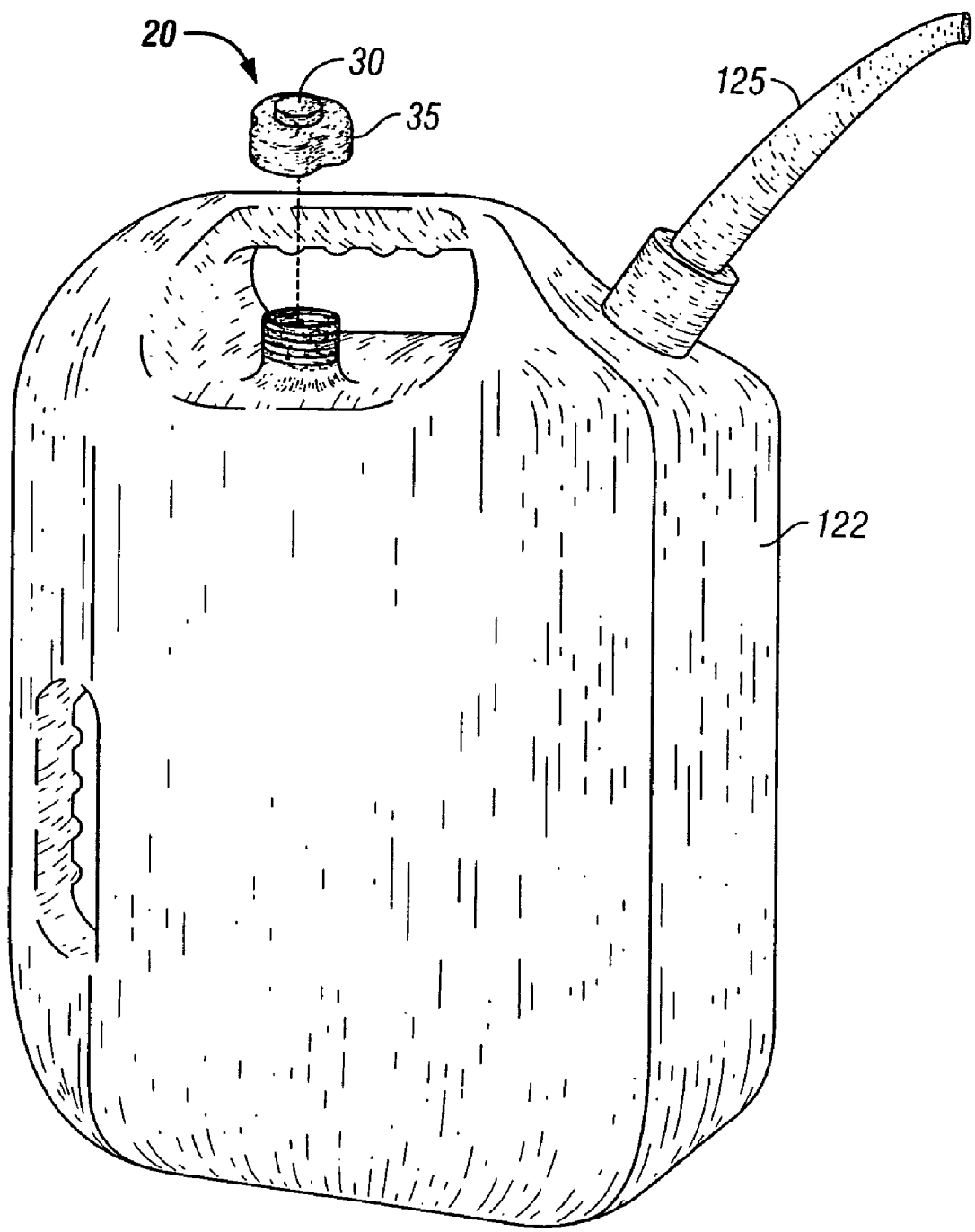
FIG. 8 is a partially exploded perspective view of a fuel container including the cap of FIG. 2.

FIG. 8 illustrates a fuel container 120 including a dispensing spout 125 and a cap 20 similar to the cap of FIGS. 1–4. The dispensing spout 125 covers a first opening through which fuel is added and removed. The cap 20 covers a second opening in the container 120. Thus, the cap 20 can be attached to the container 120 and only needs to be removed for replacement. Other cap designs, such as those illustrated in FIGS. 5–7 or in FIGS. 9–13 would also function as caps for the container 120 illustrated in FIG. 8.

In other constructions, the reservoir attaches to the inside of the container and is not visible from the outside. A receptacle within the tank or container receives the reservoir such that the container requires only one opening for filling the container and dispensing the fuel.

In still other constructions, the reservoir is formed as part of the container, as illustrated in FIG. 14. The reservoir within the container contains sufficient additive for a period of time (e.g., five years). When the additive runs out, the container is replaced or the reservoir is refilled.

Figure 9:
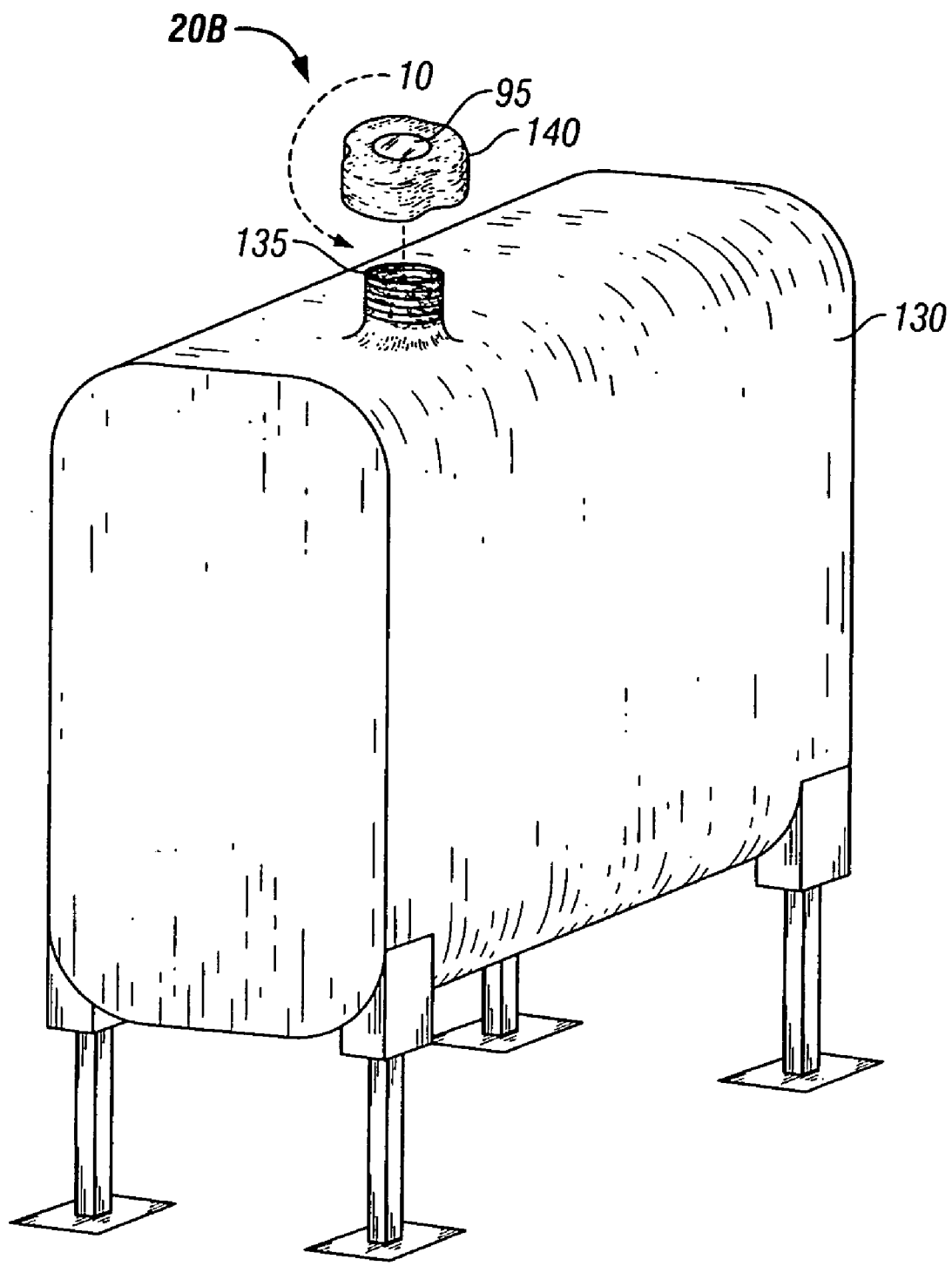
FIG. 9 is a perspective view of a fuel storage container and an alternate construction of the cap.

FIG. 9 illustrates a storage tank 130 commonly used on farms, construction sites, or other locations at which high quantities of fuel are used. A cap 20B is illustrated as covering an opening 135 in the tank 130. The cap 20B and opening 135 of FIG. 9 are exaggerated to better illustrate their location and design. Generally, these tanks 130 store dozens, or hundreds of gallons of fuel and as such are very large when compared to the fuel cap 20B.

Figure 10:
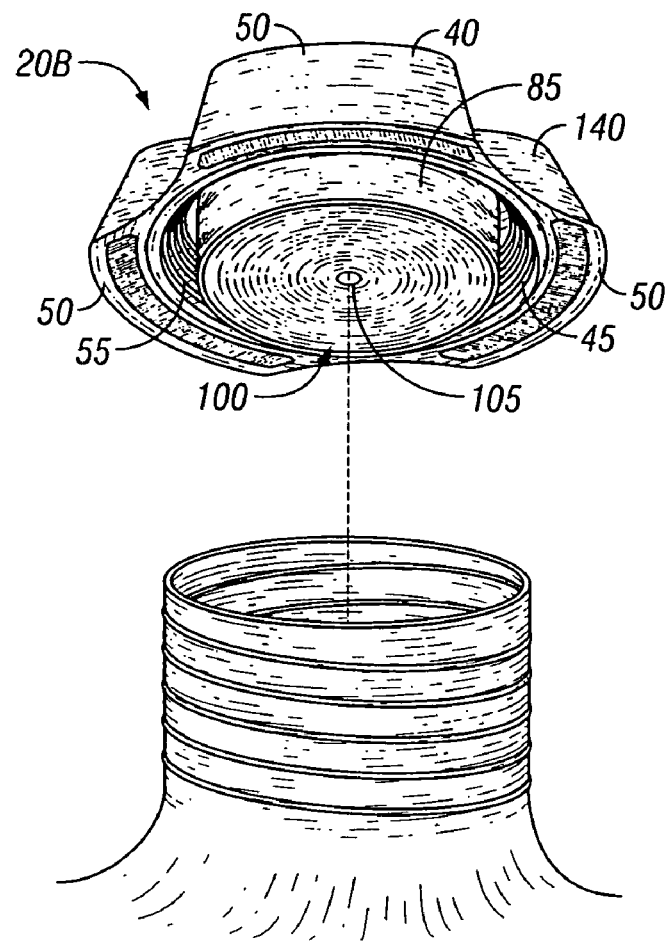
FIG. 10 is a partial perspective view of the fuel storage container of FIG. 9 including the cap of FIG. 9.

FIG. 10 better illustrates the interior of the cap 20B of FIG. 9. The cap 20B is formed from a single housing 140 that includes the reservoir and cap shell rather than the two piece cap 20A, 20B illustrated in FIGS. 1–7. Like previous constructions, the housing 140 defines the chamber 85, and includes a release section 100. The release section 100 includes an aperture 105 and a membrane 115 configured to dispense the additive at the desired rate.

Figure 11:
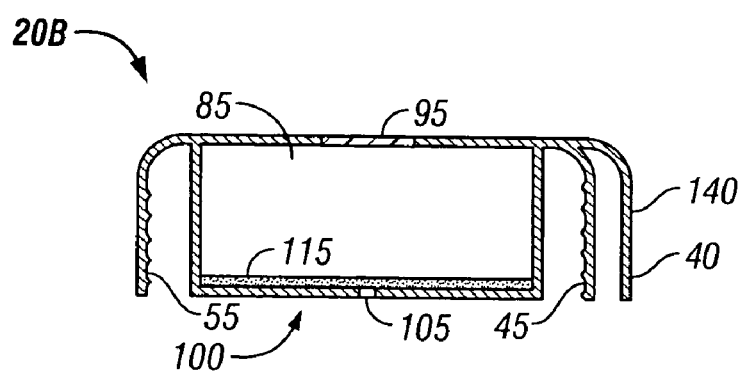
FIG. 11 is a cross-sectional view of the cap of FIG. 9.

The single piece cap 20B allows for a larger chamber 85, best illustrated in FIG. 11, than can be achieved using the two-piece construction. The larger chamber 85 allows the cap 20B to provide additive for a longer period of time, or alternatively allows for a faster drip rate. The faster drip rate may be necessary for the large volume of fuel commonly held in these large storage tanks 130.

Figure 15:
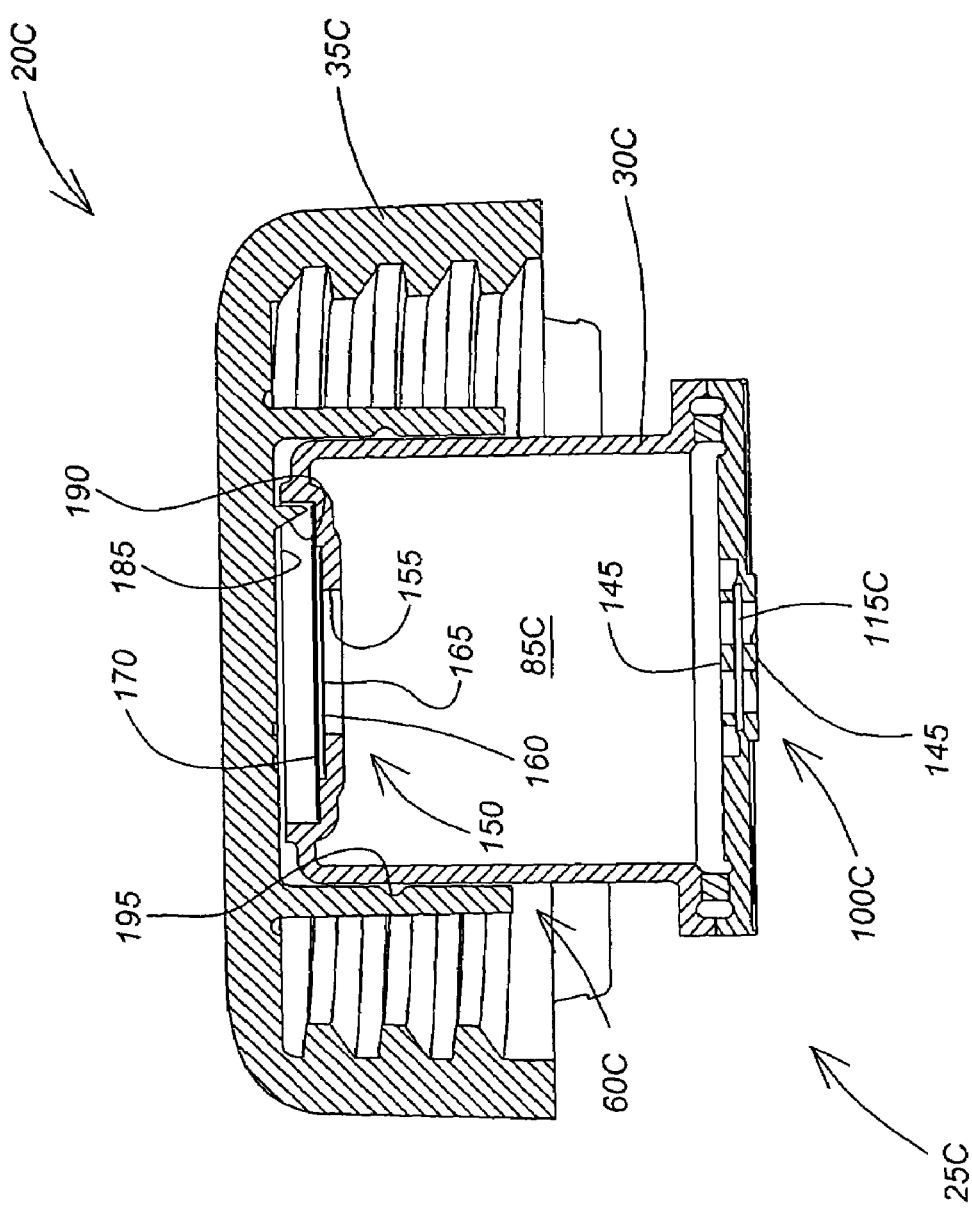
FIG. 15 is a cross-sectional view of an alternate construction of a drip feed apparatus including a vent section.
Figure 16:
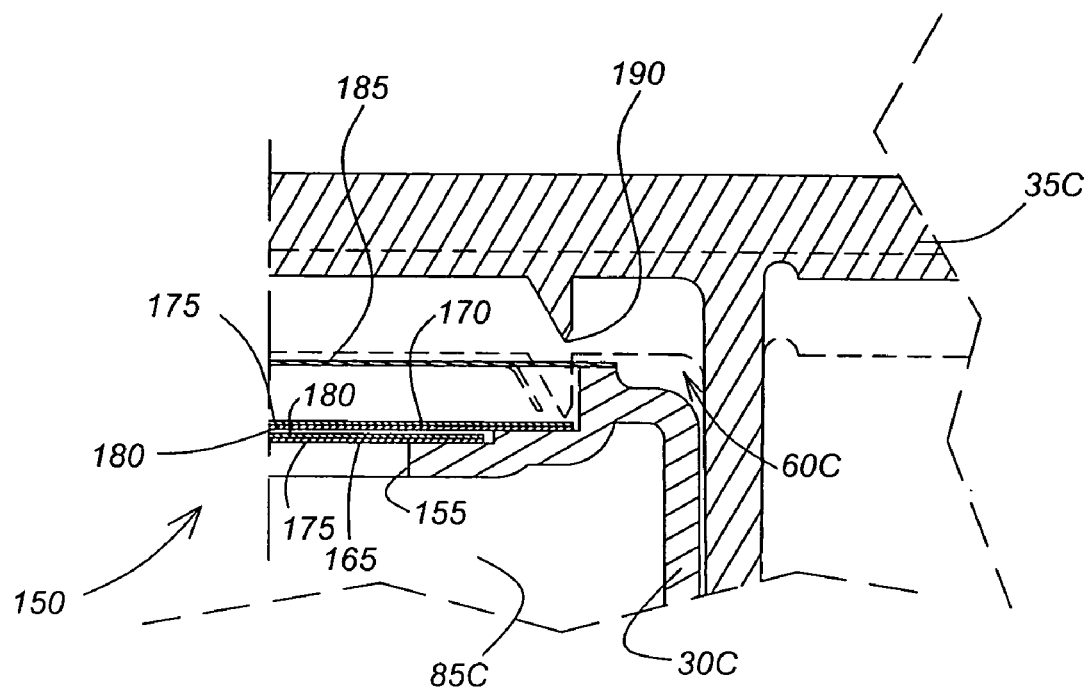
FIG. 16 is an enlarged cross-sectional view of the vent section of FIG. 15 including a pierce point.
Figure 17:
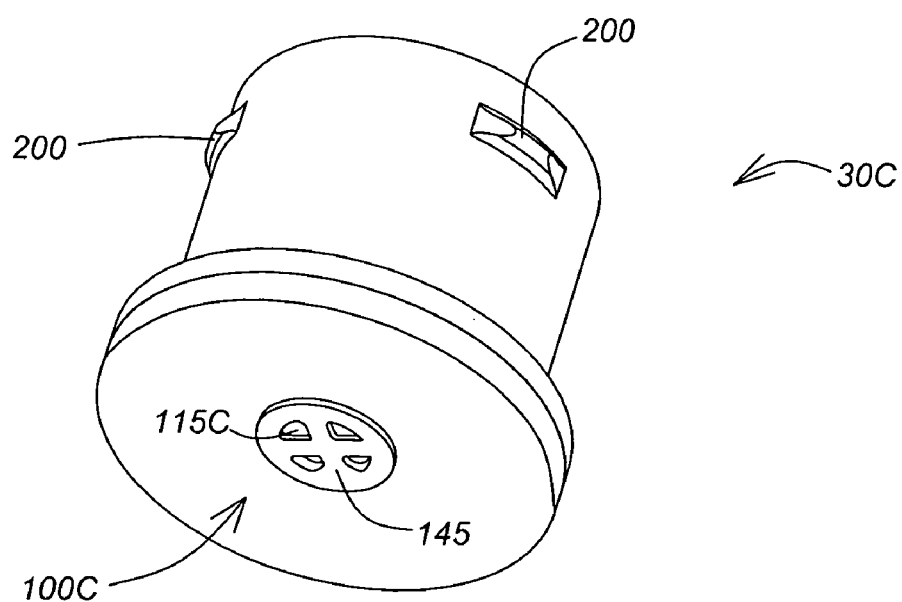
FIG. 17 is a perspective view of the reservoir of FIG. 15.

FIGS. 15–17 illustrate another construction of a cap 20C including a drip feed apparatus 25C. With reference to FIG. 15, the cap 25C includes a reservoir 30C and a cap shell 35C. As with the previous constructions, the reservoir 30C defines a chamber 85C sized to hold a desired volume of fuel additive. The reservoir 30C also includes a release section 100C that includes a membrane 115C similar to that described with regard to previous constructions.

The membrane 115C covers an aperture 105C positioned in the bottom surface of the reservoir 30C. A cross-hair arrangement 145, illustrated in FIG. 17 provides additional support for the membrane 115C and prevents the membrane 115C from passing through the aperture 105C. The cross-hair arrangement 145 can be formed as part of the reservoir 30C or can be added to the reservoir 30C during an assembly process. In addition, the cross-hair arrangement 145 may include a support structure on the top surface of the membrane 115C as well as the bottom surface, as illustrated in FIG. 15. The use of the cross-hair arrangement 145 allows for the use of a larger aperture 105C. The larger aperture 105C may be necessary in some designs to achieve the desired drip rate.

A removable layer covers the membrane 115 to protect the membrane 115 during shipment or storage and to prevent unwanted leakage of fuel additive. The removable layer includes a sticky layer that adheres to the surface of the reservoir 30 to cover the membrane. To begin dispensing the additive, the user must first peel off the removable layer. Many methods may be used to attach the removable layer to the reservoir 30 (e.g., glue, adhesive, magnets, static cling and the like).

With reference to FIG. 15, the reservoir 30C includes a vent section 150 positioned in the top surface of the reservoir 30C. The vent section 30C includes a vent opening 155 covered by a semi-permeable membrane 160. The vent opening 155 includes one or more apertures formed in the reservoir 30C. The vent opening 155 provides fluid communication between the atmosphere outside of the chamber 85C and the chamber 85C defined within the reservoir 30C. The membrane 160 covers the vent opening 155 to inhibit the flow of unwanted substances (e.g., fuel, water, fuel additive, dirt, lawn clippings and the like) into or out of the reservoir 30C.

FIG. 16 illustrates one possible membrane 160 in detail. The membrane 160 includes two thin layers of material. The first or inner layer 165 attaches to the reservoir 30C and covers the vent opening 155. The second or outer layer 170 is spaced a small distance from, and covers the inner layer 165. An adhesive or other attachment means fixedly attaches each layer 165, 170 to the reservoir 30C.

Each of the upper and lower layers 165, 170 includes a wetting-resistant material 175 attached to a support surface 180. Each layer 165, 170 is typically between 3.8 and 8.0 mils thick, with thinner or thicker layers being possible. To provide the desired wetting-resistance, the inner layer 165 is arranged with the wetting-resistant material 175 facing into the reservoir 30C. This has the desired effect of inhibiting the passage of fuel additive through the vent section 150. Any fuel additive that splashes, or otherwise contacts the inner layer 165 quickly drips off without wetting the inner layer 165. The outer layer 170 is positioned above the inner layer 165 and is oriented with the wetting-resistant material 175 facing away from the reservoir 30C. Thus, any moisture or fuel that may collect on top of the reservoir 30C will not wet the layer 170 and will be inhibited from passing through the outer layer 170. Air on the other hand, passes substantially freely through both the upper and lower layers 165, 170 to allow the vent section 150 to equalize pressure between the fuel tank or container to which the cap 20C is attached and the chamber 85C within the reservoir 30C.

Preferably the inner and outer layers 165, 170 are highly oleophobic (resistant to hydrocarbon-based substances) and/or hydrophobic (resistant to water-based substances). The layers 165, 170 each include a modified polyethersulfone polymer cast on a non-woven polyester support. One material well suited to this application is Supor 450 R Membrane (FluoRepel treated) as manufactured by Pall Specialty Materials located at 25 Harbor Park Drive, Port Washington, N.Y. 11050.

It should be noted that while a two-layer membrane 160 has been described, other constructions may include a single layer membrane 160, or a membrane 160 made up of more than two layers. As such, the membrane 160 should not be limited to the example just described.

A protective layer or layer 185, illustrated in FIG. 16, covers the vent section 150 and protects the membrane 160 from damage that is sometimes caused during shipment or storage of the reservoir 30C. The protective layer 185 attaches to the top of the reservoir 30C and provides a substantially air tight seal. The layer 185 preferably includes an aluminum foil that attaches to the reservoir 30C using an adhesive. Other materials such as plastic could be used for the protective layer 185.

In order for the vent section 150 to function as desired, the protective layer 185 must be removed or punctured. To facilitate the accurate puncturing of the layer 185 without damaging the membrane 160, the present construction includes a pierce point 190 formed as part of the cap shell 35C. As the reservoir 30C is inserted into the cap shell 35C, the pierce point 190 contacts and pierces the layer 185 (as shown in broken lines in FIG. 16). With the reservoir 30C in its final operating position, the pierce point 190 rests just above the membrane 160, thus making it difficult for the pierce point 190 to damage the membrane 160 during the installation process. To further reduce the likelihood of damage, the pierce point 190 is positioned on a diameter well outside of the vent opening 155. As such, if the pierce point 190 did contact the membrane 160, the contact would occur in the region where the membrane 160 attaches to the reservoir 30C and would likely have no detrimental affect on the performance of the vent section 150.

It should be noted that other constructions include a pierce point that is inserted into or through the cap shell 35C after the reservoir 30C and the cap shell 35C are attached to one another. Still other constructions use pierce points that attach to the cap shell 35C instead of being formed as part of the cap shell 35C. As such, the invention should not be limited to pierce points that are formed as part of the cap shell 35C.

Simply piercing the protective layer 185 provides sufficient air flow for the vent section 150 to function properly. However, it is possible to use the pierce point 190 as a knife to remove a substantial portion of the protective layer 185 from the reservoir 30C. After the pierce point 190 pierces the protective layer 185, rotation of the reservoir 30C will sever the protective layer 185 along a circle having a radius approximately equal to the radial position of the pierce point 190. For constructions that use threaded connections between the reservoir 30C and the cap shell 25C, continued rotation of the reservoir 30C during installation will completely sever a large portion of the protective layer 185 from the reservoir 30C.

With reference to FIGS. 15 and 17, a tab and slot attachment arrangement between the reservoir 30C and the cap shell 25C is illustrated. The cap shell 25C includes a slot 195 positioned on the inner surface of the reservoir receptacle 60C and spaced a distance from the pierce point 190. The outer surface of the reservoir 30C includes tab members 200 as illustrated in FIG. 17. While the construction illustrated herein includes three tabs 200, other constructions may include one continuous or non-continuous tab, or any number of tabs greater than two.

The tabs 200 are sufficiently flexible to deflect as the reservoir 30C is inserted into the receptacle 60C, thereby allowing for the easy installation of the reservoir 30C into the cap shell 35C. The tabs 200 are sized and positioned to fit into the slot 195 at the point where the reservoir 30C is located in its final operating position. In this position, the pierce point 190 has completely pierced the protective layer 185 as shown in broken lines in FIG. 16. Because the slot 195 is continuous, the reservoir 30C can be rotated to sever a portion of the protective layer 185 if desired. In other constructions, the slot 195 is not continuous, thus preventing the rotation of the reservoir 30C within the cap shell 25C.

As described above, the release section 100 of the reservoir 30, 30A, 30C or the one-piece cap 20B is designed to deliver the desired volume of fuel additive at the desired flow rate for the particular application in which it is being used. The desired drip rate is a function of many variables (e.g., fuel additive make-up, engine size, frequency of engine use, type of fuel, venting, etc.). Continuing the chain saw example, a release section 100 that delivers a single drop of additive every three days may provide the desired protection to the chain saw engine. However, a large fuel storage container may require ten or more drops per day to properly treat the fuel.

Different drip rates or flow rates can be achieved by varying the design of the release section 100. For example, a very slow drip rate may be achieved by providing a small aperture 105 and a relatively thick membrane 115 in conjunction, while a fast drip rate may be achieved by providing a delivery mechanism including only a membrane 115. One having ordinary skill in the art will realize that any desired drip rate may be achieved with the present invention.

In preferred constructions, the housings (sometimes referred to herein as cap shell, reservoir, or housing) are made from high-density polyethelene (HDPE), with other materials being possible (e.g., composites, ceramics, metals, etc.). HDPE provides the strength and durability required while remaining easy to manufacture. Other materials, including metals, may be suitable for one or both of the housings. To further enhance the seal provided by the housings, fluorinated HDPE can be used. Fluorinated HDPE provides a vapor barrier that substantially reduces the rate of fuel vapor escape from the container or tank 15.

Many different fuel additives are available that can be dispensed by the invention. In addition, different mixtures of fuel additives can be employed. For example, a mixture of several different compounds including a multifunctional additive, an antioxidant, a corrosion inhibitor, and a metal deactivator may be desirable. One additive package includes a mixture comprising approximately 68% HiTec 4733 Antioxidant as sold by Ethyl Corporation located at 330 South Florida Street Richmond, Va. 23218-2183. The mixture also contains approximately 2% HiTec 4705 Metal Deactivator also sold by Ethyl Corporation. The remainder of the mixture, approximately 30% is made up of Ashland Low Odor Base Solvent #529-66 (Naptha) as sold by Ashland Distributing Company, P.O. Box 2219, Columbus Ohio 43216.

Yet another additive package includes a mixture comprising approximately 57% DMA-54HF, 36% AO-30, 3.5% DCI-6A and 3.5% DMD-2. DMA-54HF, AO-30, DCI-6A, and DMD-2 are trade designations for compounds sold by Octel Starreon, LLC of Littleton Colo. DMA-54HF is a composition of components commonly sold as a multifunctional additive for fuel. AO-30 is a composition of chemicals commonly sold as an antioxidant. DCI-6A is a chemical composition sold as a corrosion inhibitor, while DMD-2 is a chemical composition sold as a metal deactivator.

Other additives deliverable by the invention include solid additives. For example, Vanlube PCX is a solid crystalline anti-oxidant compound sold by R. T. Vanderbilt Company, Inc. of Norwalk Conn.

To deliver a solid fuel additive such as Vanlube PCX, a membrane 115 that absorbs fuel and vapors is used. The splashing within the tank or container combined with normal evaporation within the tank and condensation within the reservoir 85 wet the membrane. The crystals or powder within the reservoir 85 dissolve into the fuel absorbed by the membrane 115 and drip back into the tank. Thus, the apparatus of the invention is capable of delivering additive that is stored as a liquid or a solid.

The apparatus of the invention delivers additive to the fuel whether or not the fuel container is in use. If the fuel container is not used for a long period of time, the additive concentration within the container will increase. The higher concentration of additive enhances the protection provided by the additive during idle times. In addition, the higher concentration provides increased engine protection when the engine, powered by the fuel, is first started following an idle period.

As used herein, the terms fuel tank, fuel container, storage tank, etc. are interchangeable, as the invention will function with any vessel able to contain a fluid. As such, the invention should not be limited to the tanks or containers illustrated herein.

Although the invention has been described in detail with reference to certain preferred embodiments, variations and modifications exist within the scope and spirit of the invention as described and defined in the following claims.

What is claimed is:

1. A cap for covering an opening of a spout, the cap comprising:
    a top defining an inner surface and an outer surface;
    an engagement portion extending from the inner surface and adapted to engage the spout;
    a wall extending from the inner surface to define a container-receiving space; and
    a pierce point extending from the inner surface and at least partially disposed within the container-receiving space, the wall and the pierce point fixed with respect to one another.

2. The cap of claim 1, wherein the engagement portion includes threads integrally-formed as part of the engagement portion.

3. The cap of claim 1, wherein the top, the engagement portion, and the wall are integrally-formed as a single piece.

4. The cap of claim 1, further comprising an engagement member coupled to the wall and adapted to engage a reservoir.

5. The cap of claim 4, wherein the wall defines an inner cylindrical surface and the engagement member includes a slot extending at least partially around the inner cylindrical surface.

6. The cap of claim 4, wherein the engagement member includes threads formed as part of the wall.

7. The cap of claim 1, wherein the pierce point is integrally-formed as part of the top.

8. A cap configured to cover an opening of a spout of a fuel container and hold a reservoir that contains a fuel additive that is delivered to the fuel container after the reservoir is retained by the cap, the cap comprising:
    a lop defining an inner surface and an outer surface;
    an engagement portion integrally-formed as part of the top and extending from the inner surface, the engagement portion adapted to engage the spout;
    a wall integrally-formed as part of the top and extending from the inner surface to define a space;
    a pierce point extending from the inner surface and adapted to pierce the reservoir to enable the fuel additive to be released from the reservoir; and
    a reservoir-engagement member disposed substantially within the space and adapted to engage the reservoir to hold the reservoir at least partially within the space.

9. The cap of claim 8, wherein the engagement portion includes threads integrally-formed as part of the engagement portion.

10. The cap of claim 8, wherein the wall defines an inner cylindrical surface and the reservoir-engagement member includes a slot extending at least partially around the inner cylindrical surface.

11. The cap of claim 8, wherein the reservoir-engagement member includes threads formed as part of the wall.

12. The cap of claim 8, further comprising a pierce point extending from the inner surface into the space.

13. The cap of claim 8, wherein the wall and the pierce point are fixed with respect to one another.

14. A cap for covering an opening of a spout, the cap comprising:
    a top defining an inner surface and an outer surface;
    an engagement portion extending from the inner surface and adapted to engage the spout;
    a wall extending from the inner surface to define an inner cylindrical surface and a container-receiving space;
    a pierce point extending from the inner surface, the wall and the pierce point fixed with respect to one another; and
    one of a slot and a tab extending around at least a portion of the inner cylindrical surface and adapted to engage the other of the slot and the tab of a reservoir.

15. The cap of claim 14, wherein the engagement portion includes threads integrally-formed as part of the engagement portion.

16. The cap of claim 14, wherein the top, the engagement portion, and the wall are integrally-formed as a single piece.

17. The cap of claim 14, further comprising a pierce point that extends from the inner surface and is at least partially disposed within the container-receiving space.

18. The cap of claim 17, wherein the pierce point is integrally-formed as part of the top.

19. A cap adapted to cover a spout and support a reservoir, the cap comprising:
- a shell including a top portion and an engagement portion extending from the top portion, the engagement portion adapted to engage the spout;
- a reservoir engagement member extending from the shell and adapted to engage the reservoir;
- a pierce point coupled to the shell and positioned to puncture a portion of the reservoir, the reservoir engagement member and the pierce point fixed with respect to one another.

20. The cap of claim 19, wherein the top portion, the engagement portion, and the reservoir engagement member are integrally-formed as a single piece.

21. The cap of claim 20, wherein the pierce point is integrally-formed as a single piece with the top portion, the engagement portion, and the reservoir engagement member.

22. The cap of claim 19, wherein the reservoir engagement member defines a reservoir space and wherein the pierce point extends from the top portion and is at least partially disposed within the reservoir space.

23. The cap of claim 19, wherein the reservoir engagement member defines an inner cylindrical surface and a slot extending at least partially around the inner cylindrical surface.

24. The cap of claim 19, wherein the reservoir engagement member defines an inner cylindrical surface and includes threads formed as part of the inner cylindrical surface.

* * * * *

UNITED STATES PATENT AND TRADEMARK OFFICE
CERTIFICATE OF CORRECTION

PATENT NO. : 7,159,741 B2
APPLICATION NO. : 11/296123
DATED : January 9, 2007
INVENTOR(S) : James J. Dehn et al.

It is certified that error appears in the above-identified patent and that said Letters Patent is hereby corrected as shown below:

Claim 8, column 10, line 25 - "a lop defining..." should be -- a top defining --.

Signed and Sealed this

Third Day of July, 2007

JON W. DUDAS
*Director of the United States Patent and Trademark Office*